July 1, 1930.  I. M. LADDON  1,768,696
AIRCRAFT LANDING GEAR
Filed June 6, 1927  2 Sheets-Sheet 1
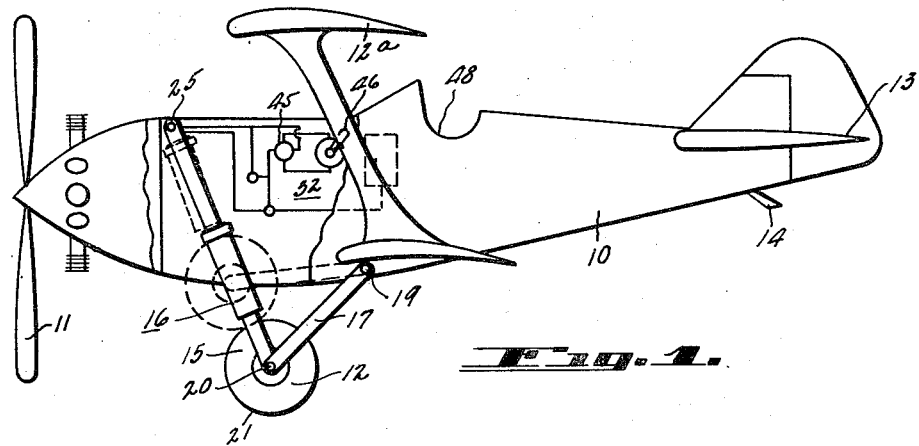
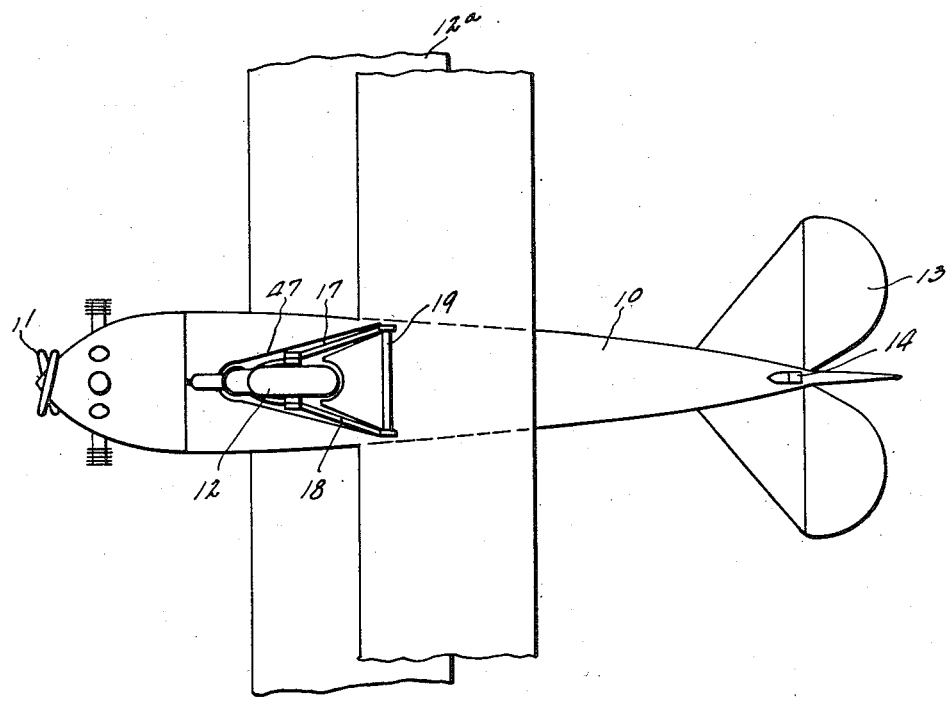
INVENTOR
Isaac M. Laddon
BY Marichal and Noe
ATTORNEYS July 1, 1930. I. M. LADDON 1,768,696
AIRCRAFT LANDING GEAR
Filed June 6, 1927    2 Sheets-Sheet 2
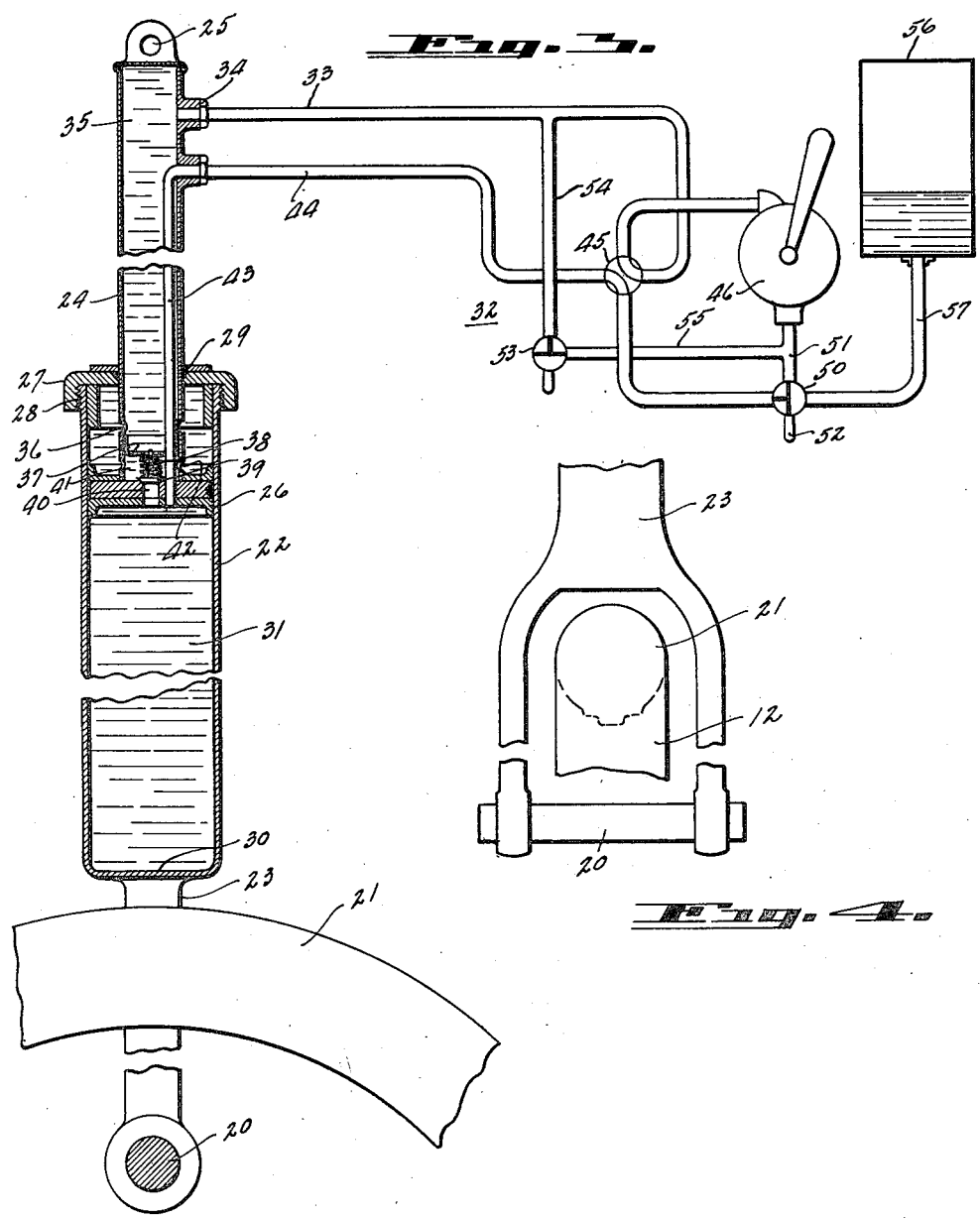
INVENTOR
BY Isaac M. Laddon
Maréchal and Noe
ATTORNEYS Patented July 1, 1930

1,768,696

UNITED STATES PATENT OFFICE

ISAAC M. LADDON, OF DAYTON, OHIO

AIRCRAFT LANDING GEAR

Application filed June 6, 1927. Serial No. 196,824.

This invention relates to aircraft landing gear.

The primary object of the invention is to provide a landing gear which may support the aircraft in such a manner as to absorb shocks incurred in landing, and which may be drawn up close to or into the body of the aircraft. Wind resistances while in flight may thus be reduced and when used on hydro-aeroplanes the aircraft may be better adapted to land upon either the land or the water.

A further object of the invention is to provide a shock absorbing retractible landing gear which will be sturdy in construction but which will support the aircraft so as to smooth out and absorb both the main shock of the initial landing and other minor shocks incurred as the aircraft taxies over the rough ground, without the creation of any objectionable rebound.

Further objects and advantages of the invention will be apparent from the following description and from the accompanying drawings, wherein one embodiment of the invention is set forth.

In the drawings

Fig. 1 is a side elevation of an airplane embodying the present invention, part of the fuselage being broken away to more clearly illustrate the landing gear;

Fig. 2 is a bottom plan view of Fig. 1;

Fig. 3 is a view showing the fluid system by which the landing gear is controlled; and Fig. 4 is a detailed view showing the connection of the landing wheel to the wheel strut.

Referring to these drawings more particularly by reference numerals, in which corresponding numerals designate like parts in the various views, the invention as herein shown is applied to an airplane, having a fuselage 10 provided with the customary propelling means 11, sustaining surface 12ª, and steering surfaces 13 of any suitable character. In the embodiment shown the airplane is supported on the ground by a tail skid 14 and a main landing gear 15, together with wing skids, of any suitable nature, not shown. The main landing gear, as shown, comprises a single wheel 12 which is supported from the fuselage by means of a telescopic strut connection 16, and rearwardly diverging brace struts 17 and 18 are pivotally connected at 19 to the main strength members or longerons customarily provided at the bottom side portions of the fuselage. The forward ends of these brace struts are attached to the outer ends of the wheel axle 20 on which is mounted the wheel 12 provided with the usual resilient tire 21.

The telescopic strut 16 embodies a piston and cylinder construction, the cylinder 22 being rigidly attached to the wheel supporting end 23 which is suitably forked as shown in Fig. 4 so that it straddles the wheel and rotatably mounts the opposite end portions of the wheel axle 20. The strut 16 extends upwardly and forwardly from the wheel and at its upper end is formed as a hollow rigid member 24, the upper end of which is pivotally connected at 25 to the fuselage framework. The connection 25 permits pivotal movement of the strut 16 about a horizontal axis. The lower end of the part 24 extends into the cylinder 22 and is rigidly attached to a piston 26 which neatly fits within the cylinder so that it may be moved endwise of the cylinder in a manner as will be more fully described.

The cylinder 22 is closed at its upper end by means of the top cylinder cap 27 which is threaded as indicated at 28 on the end portion of the cylinder. This cap 27 is provided with a central opening 29 adapted to slidingly receive the circular part 24 of the telescopic strut by a suitable liquid-tight joint. The lower end of the part 24 is formed rigid with the piston 26 which is guided within the cylinder, and the side walls of the cylinder together with the sliding connection between the part 24 and the cap 27 thus maintain the upper and lower portions of the telescopic strut in alignment at all times while permitting the piston to move within the cylinder. The cylinder itself is permanently closed at its lower end as indicated at 30 and the bottom of this cylinder is formed integrally with the depending portion 23 to which the wheel axle is attached, so that any loss of fluid from the lower end of the cylinder is absolutely prevented. The cylinder is filled with fluid such as a liquid oil 31 and opposite ends of the cylinder are connected to a fluid system indicated generally 32. This system as shown is a closed liquid filled system from one end of the cylinder to the other, and embodies a pipe 33 which is connected by means of a pressure-tight joint 34 so that it communicates with the interior 35 of the hollow upper part 24 of the strut. The part 24 is provided with series of openings 36 near its lower end which places the interior of the part 24 in communication with the upper end of the cylinder at all times. Just below the level of the holes 36 is a partition 37 which is firmly fastened in place and against which presses the upper end of a spring 38 positioned just below the level of the partition. The opposite end of this spring presses against the upper side of a valve 39 which is normally seated in a valve seat provided in the piston so as to close a restricted passage 40 in the center of the piston. When open the valve 39 permits the fluid or oil 31 to pass from the lower part of the cylinder through the passage 40 to the chamber 41 adjacent the valve which is at all times in communication by means of a series of holes 42, with the upper portion of the cylinder. The valve spring 38 is preferably of a suitable nature so that, when the airplane is at rest on the ground with its weight supported by the landing wheel, the valve spring will remain seated and prevent the flow of fluid through the passage 40. The strength of the spring 38 however, is preferably such that when the weight supported by the landing gear is equivalent a substantial overload, say for example about one and one-half times the normal load of the airplane, then the valve will be forced upwardly from its seat by reason of the pressure exerted on the liquid below the piston and permit the liquid to flow through the piston to the upper end of the cylinder, thus absorbing the shock or shocks which may be incurred while the airplane is taxiing over rough territory or during a landing. The lower portion of the cylinder 22 communicates by means of a pipe 43 which may be supported within the part 24 of the telescopic strut as indicated in Fig. 3, to the pipe 44 of the closed fluid system 32. The pipes 33 and 44 of the fluid system communicate with a connecting valve 45 which is connected to a fluid pump 46 adapted to be operated as by means of a manual lever which may be oscillated back and forth to pump the fluid. The fluid may thus be pumped out of the lower end of the cylinder through pipes 43 and 44 and forced through the pipe 33 back to the upper end of the cylinder above the piston. Such a circulation of the liquid causes the retraction or raising of the landing gear toward or into the lower portion of the fuselage body.

By having the cylinder formed with a closed lower end having no joints capable of leaking, and connecting the cylinder to the ground engaging member it will be impossible for any liquid to be lost from the system below the piston where the highest pressures are obtained. The upper part of the cylinder is not liable to lose any liquid through the sliding connection between cap 27 and part 24 since this joint is at the very top of the cylinder, and the upper part of the cylinder above the piston is never subjected to high pressures, and is usually under little or no pressure.

In Fig. 1 the extended position of the landing gear is shown in full lines and the dotted lines indicate the retracted position. When retracted the major portion at least of the landing gear and a portion of the wheel itself may be partly housed within the fuselage body. The lower portion of the fuselage body is provided with cutaway portions as indicated at 47, Fig. 2, so as to permit the housing of the brace struts 17 and 18 and the landing wheel itself. The fluid pump 46 is positioned closely adjacent the pilot's cockpit 48 so that he may readily operate the pump to cause the retraction of the landing gear. It will be apparent that when the length of the telescopic strut 16 is shortened by causing the piston to descend in the cylinder, the pivotal mounting of the brace struts 17 and 18 permit the wheel to be raised. The rearwardly diverging and upwardly inclined brace struts 17 and 18 firmly brace the landing gear when extended or retracted and permit the load to be absorbed or taken mainly by the telescopic strut 16.

During a landing operation the passage of fluid through the pipes 33 and 44 is prevented since at this time the pump is at rest. The shock of landing is therefore absorbed by the automatic opening of the valve in the piston 26 so that the liquid in the bottom portion of the cylinder may flow through the restricted passage 40 and thus travel to the upper portion of the cylinder and permit the piston to be "squashed" down in the cylinder. The extent of movement of the piston within the cylinder while landing is determined by the degree of the shock of landing. While taxiing over the ground any major shocks which may be imposed upon the landing wheel will be absorbed by the automatic opening of the valve in the piston and the consequent "squash" which results. Any minor shocks imparted to the landing wheel will be absorbed by the tire on the wheel, the valve in the piston at such times being maintained closed by the spring 38 until the load imposed on the landing gear is in excess of about one and one-half times the normal weight of the airplane.

As previously mentioned the pipe 33 of the closed fluid system connects with one side of the pump 46, the other side of the pump being connected to a pipe 51 and a valve 50, which may be adjusted manually by the handle 52 to its normal position indicated in Fig. 3 so that the pipe 51 communicates with pipe 44. In this position of the valve 50 the pump 46 may be operated to withdraw the oil from the lower part of the cylinder and force it into the upper part of the cylinder. Such an operation retracts or draws up the landing gear to a position where it will offer less wind resistance, and as the pump 46 is in position to be conveniently operated from the pilot's cockpit the landing gear may thus be retracted while the airplane is in flight. Before landing and with the valve 50 in the position indicated in Fig. 3, it being assumed that the cylinder 22 has previously been raised so that the piston is adjacent the lower portion of the cylinder, the pilot operates a by-pass valve 53 to the position indicated in Fig. 3 so that communication is established between the by-pass pipes 54 and 55 to permit the fluid to flow through pipe 33 to pipe 51 without passing through the pump. The weight of the landing gear, the wheel, the cylinder itself and the brace struts 17 and 18 will then cause the fluid within the upper part of the cylinder above the piston to be forced out of the pipe 33 and be returned into the lower part of the cylinder. This causes the landing gear to be placed in its extended position. When a landing is to be effected communication between pipes 51 and 44 is prevented since the pump is at rest and valve 53 closed, the piston at this time being at the upper end of the cylinder. The flow of fluid through the restricted passage 40 in the piston and the squash of the piston will then absorb the major shock or shocks of landing.

If desired and as shown in Fig. 3 the pipe 44 may be placed in communication with a closed tank or chamber 56 containing some resilient or compressible medium such as air. A pipe 57 connects this tank to the valve 50, which may be moved counterclockwise 90 degrees from the position shown in Fig. 3 to establish communication between the tank and the lower cylinder portion. With the valve positioned as just indicated the pressure exerted by the plane on the liquid in the lower end of the cylinder may serve to compress the air in the closed tank 56 which thus forms a resilient shock absorbing medium. Some of the liquid from the lower cylinder portion is thus forced into the tank, compressing the air until the weight of the plane is balanced, and in this manner the normal resiliency of the gear due to the tire itself is assisted by the resilient air in the tank. The pressure on opposite sides of the piston may be equalized when desired by placing the pipe 33 in communication with the pipe 44 by suitable operation of the valves 50 and 53, and the tank 56 may be entirely cut out of operation when desired by suitable manipulation of the valve 50.

If a long and rough landing is encountered the pilot may at any time operate the pump 45 so as to force more oil from the upper part of the cylinder to the lower part thereof so as to cause the further extension of the landing gear in case the piston has moved down too far into the cylinder. Thus the ground clearance of the propeller may be maintained even while the oil is flowing through the restricted passage 40 from the lower portion of the cylinder. It will thus be apparent that even though the last portion of the stroke of the piston within the cylinder is within the retracting range, the pump may be instantly operated to maintain a safe propeller clearance. The design of the landing gear, however, is preferably such that only impacts of a magnitude which would be liable to wreck the ordinary chassis would cause such a motion of the piston within the cylinder as to dangerously decrease the ground clearance of the propeller. To enable the fluid to be pumped from the upper into the lower part of the cylinder, an adjustable valve 45 connects the pipes 33 and 51 to the pump so that by proper adjustment of the valve the connections to the pump may be reversed. Thus, when the valve 45 is moved through 90 degrees from the position shown in Fig. 3 the pipe 33 will be connected to the intake side and the pipe 44 to the discharge side of the pump.

Although the embodiment of the invention which has been herein described refers to a single landing wheel adapted to be retracted and capable of absorbing the shocks of landing; it will be apparent to those skilled in the art that my invention is susceptible of use with landing gears of other types embodying a plurality of wheels or other ground engaging members. While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft, a body, and a shock absorbing landing device therefor comprising a ground engaging member, a telescopic strut for supporting said member on said body and embodying a piston and cylinder construction, said piston being connected to said body and said cylinder having a closed lower end connected to said member and manually controlled means for causing the retraction of said landing device.

2. In an aircraft, a body, and a retractible shock absorbing landing device therefor comprising a ground engaging member, a telescopic strut for supporting said member on said body and embodying a piston and cylinder construction, a closed fluid system interconnecting opposite ends of said cylinder, and means for controlling the flow of fluid from one end of said cylinder to the other.

3. In an aircraft, a body, and a retractible shock absorbing landing device therefor comprising a ground engaging member, a telescopic strut for supporting said member on said body and embodying a piston and cylinder construction, liquid damping means within said cylinder, and means for controlling the flow of fluid from one side of said piston to the other to permit the retraction of the member towards the body while in flight.

4. In an aircraft, a body, and a shock absorbing landing device therefor comprising a ground engaging member, a piston and cylinder construction for movably supporting said member on said body, said piston being connected to the body and the cylinder having a closed lower end connected to said member, a closed liquid system interconnecting opposite ends of said cylinder and means for controlling the flow of liquid from one side of the piston to the other.

5. In an aircraft, a body, and a retractible shock absorbing landing device therefor comprising a ground engaging member, a telescopic strut for supporting said member on said body and embodying a piston and cylinder construction, fluid damping means within said cylinder, a connection between opposite ends of said cylinder, and means for forcing fluid through said connection from one end of the cylinder to the other to cause the member to be moved in relation to the body.

6. In an aircraft, a body, and a retractible shock absorbing leading device therefor comprising a ground engaging member, a telescopic strut for supporting said member on said body and embodying a piston and cylinder construction, liquid damping means within said cylinder, a restricted connection between opposite sides of said piston, a spring pressed closure for said connection adapted to yield at a predetermined pressure to permit the liquid to flow from the lower to the upper part of said cylinder, and means for forcing liquid from one end of said cylinder to the other.

7. In an aircraft, a body, and a retractible shock absorbing landing device therefor comprising a ground engaging member, a telescopic strut for supporting said member on said body and embodying a piston and cylinder construction, liquid damping means within said cylinder, a restricted connection between opposite sides of said piston, a spring pressed closure for said connection adapted to yield at a predetermined pressure to permit the liquid to flow from the lower to the upper part of said cylinder, and means for forcing liquid from one end of said cylinder to the other, said last means comprising a manually operable pump.

8. In an aircraft, a body, and a retractible shock absorbing landing device therefor comprising a ground wheel, a telescopic strut supporting said wheel on said body and embodying a piston and cylinder construction, a closed fluid system connecting opposite ends of said cylinder, a pump in said system adapted to force fluid from the lower to the upper end of said cylinder to raise the wheel towards the body, and means in said system to cause the unobstructed interconnection of opposite ends of said cylinders to permit the piston to descend in said cylinder.

9. In an airplane, a fuselage, a ground wheel therefor, liquid damping means for absorbing the shock of landing and a pump connected to said means for retracting the wheel.

10. In an airplane, a fuselage, a ground wheel for said fuselage for taking the entire shock of landing, and hydraulic means for retracting the ground wheel and for absorbing the shocks communicated therefrom.

11. In an airplane, a fuselage, landing means therefor, liquid damping means for absorbing the shock of landing and a pump connected to said means for retracting the landing means.

12. In an airplane, a fuselage, landing means for said fuselage for taking the entire shock of landing, and hydraulic means for retracting the landing means and for absorbing the shocks communicated therefrom.

In testimony whereof I hereto affix my signature.

ISAAC M. LADDON.